US006272390B1

(12) United States Patent
Skovgaard

(10) Patent No.: US 6,272,390 B1
(45) Date of Patent: Aug. 7, 2001

(54) METHOD FOR INTERACTIVE CONFIGURATION AND COMPUTER READABLE MEDIUM ENCODED WITH A PROGRAM FOR PERFORMING SAID METHOD

(75) Inventor: Hans Jorgen Skovgaard, Farum (DK)

(73) Assignee: Beologic A/S, Herlev (DK)

( * ) Notice: Subject to any disclaimer, the term of this patent is extended or adjusted under 35 U.S.C. 154(b) by 0 days.

(21) Appl. No.: 08/998,621

(22) Filed: Dec. 29, 1997

(30) Foreign Application Priority Data

Sep. 9, 1997 (DK) .................................................. 1030/97

(51) Int. Cl.$^7$ ...................................................... G06F 19/00
(52) U.S. Cl. ............................. 700/103; 700/97; 700/104
(58) Field of Search ................................. 700/29, 30, 33, 700/49, 97, 103, 104; 706/46, 47

(56) References Cited

U.S. PATENT DOCUMENTS

| 5,136,698 | | 8/1992 | Okamoto | 395/375 |
| 5,260,866 | | 11/1993 | Lisinski et al. | 364/401 |
| 5,331,545 | * | 7/1994 | Yajima et al. | 700/97 |
| 5,515,524 | | 5/1996 | Lynch et al. | 395/500 |
| 5,642,471 | * | 6/1997 | Paillet | 395/51 |
| 5,761,063 | * | 6/1998 | Jannette et al. | 364/468.03 |
| 5,809,212 | * | 9/1998 | Shasha | 706/45 |
| 5,987,473 | * | 11/1999 | Jorgensen | 707/104 |

FOREIGN PATENT DOCUMENTS

| 0 666 534 A2 | 8/1995 | (EP) . |
| 2 294 340 | 4/1996 | (GB) . |
| WO 97/15886 | 5/1997 | (WO) . |

OTHER PUBLICATIONS

Axling, Tomas et al., "A Tool for Developing Interactive Configuration Applications," The Journal of Logic Programming, 1996, pp. 147–168.
Marchiori, Elena et al., "Forward–Tracking: A Technique for Searching Beyond Failure," pp. 1–8 (Date Unknown).
Kondrak, Grzegorz et al., "A Theoretical Evaluation of Selected Backtracking Algorithms," University of Alberta, 1997, pp. 1–21.

* cited by examiner

Primary Examiner—Paul P. Gordon
(74) Attorney, Agent, or Firm—Oliff & Berridge, PLC

(57) ABSTRACT

An interactive computer configuration system is an aid for a sales person or a customer to make it easy to grasp and configure a huge configuration problem. The user interacts with the computer system and makes many choices successively, and a configuration engine checks each choice for validity. The configuration engine comprises a configuration model defining mutual predefined relations between the selectable elements and comprises programs for validating a set of choices against said configuration model. The invention relates to the situation where a requested choice made by the user corresponds to an invalid configuration instance. According to the invention, the user is allowed to insist on this choice and an alternative investigation system according to the invention will present to the user a number of relevant proposals for undoing choices made previously so that a valid configuration instance can be obtained. According to the invention only relevant proposals are presented to the user and further in the most expedient way, seen from a customer's point of view. According to the invention the lowest possible number of choices to be undone is first presented to the user. Yet, a further aspect of the invention allows the user, during the alternative investigation process, to make previous choices cardinal choices, whereby the relevance of the proposals for obtaining alternatives will be further enhanced.

27 Claims, 7 Drawing Sheets a ●●●●●●●●●●●●●●●●●●●●●●●●●●
b ●●●●●●●●●●●●●●●●●●●●●●●●●●○
c ●●●●●●●●●●●●●●●●●●●●●●●●●○●
d ●●●●●●●●●●●●●●●●●●●●●●●●●○●●
.....
e ○●●●●●●●●●●●●●●●●●●●●●●●●●●●
f ●●●●●●●●●●●●●●●●●●●●●●●●●●○○
g ●●●●●●●●●●●●●●●●●●●●●●●●●○●○
.....
h ○●●●●●●●●●●●●●●●●●●●●●●●●●○
i ●●●●●●●●●●●●●●●●●●●●●●●●○○●
j ●●●●●●●●●●●●●●●●●●●●●●●●○●○●
.....
.....
k ○○●●●●●●●●●●●●●●●●●●●●●●●●●
l ●●●●●●●●●●●●●●●●●●●●●●●●●○○○
.....

FIGURE 5.

| NEXT | S=3 is an invalid choice. If you want a system generated proposal for an alternative configuration, please click on NEXT. |
| --- | --- |
| PREVIOUS | |
| FIRST | Cardinal choices |
| DO/UNDO CARDINAL CHOICE | S=3 |
| ACCEPT PROPOSAL FOR ALTERNATIVE | |

FIGURE 6a.

METHOD FOR INTERACTIVE CONFIGURATION AND COMPUTER READABLE MEDIUM ENCODED WITH A PROGRAM FOR PERFORMING SAID METHOD

BACKGROUND OF THE INVENTION

This invention relates to the solving of configuration problems by means of a computer acting as a configuration aid for either a salesperson or the customer himself. E.g. configuring a car, i.e. choosing a specific combination of engine, paint, accessories, etc. or e.g. configuring a computer system comprising different kinds of CPU's, discs, monitors, communication units, etc. will typically result in a huge and very complicated problem because of a great number of choices to be made and an overwhelming system of constraints between the different elements to be decided on.

A computer system intended to solve a configuration problem is a special application of artificial intelligence where the problem can be stated in terms of a set of selectable elements (e.g. engines, colours . . . ) and a number of relations (constraints) between these selectable elements (e.g. convertible only available in the colour Monte Carlo yellow).

In the following a selectable element is anything that can be included or excluded in a configuration. It can be a physical object (e.g. a car or a computer system as mentioned), an attribute (e.g. the colour red or the texture pattern of a carpet) or something abstract (e.g. a specific number of trips between home and work or a particular type of contracts).

Typically, selections are constrained by previous choices of elements. If for instance a shopper in a supermarket wants only to buy ecological products he may not be able to buy coffee. Thus, when selecting parts or features in a configuration system there should never be any available selections which are in fact invalid. This might seem very easy but is in fact one of the main difficulties in interactive configuration systems, as will be understood more fully from the following description.

The shopper from before could choose not to buy only ecological products. He may also choose not to buy coffee even if it is available.

An interactive computer configuration system is an aid for the salesperson or the customer to make it just as easy to grasp and configure a huge configuration problem as it is for a customer in the supermarket to know himself that he has bought exactly what he needs to treat his dinner guests according to his own decisions, and the expectations of the guests and the information supplied by the supermarket such as display of key figures, descriptions, graphics and video which change according to the customer's current focus and history.

PRIOR ART

Interactive configuration systems comprise a configuration model defining mutual predefined relations (constraints) between selectable elements and comprise programs for validating a set of choices against said configuration model.

Batch mode configuration systems are known, but only interactive systems are of interest where the user can make choices successively, and each time a choice is made obtain an answer from the configuration system. The answer may be an accept of the user's choice. It may also be other deduced consequences, or the answer could be a rejection of the choice made by the user because the inference engine finds out that the last choice made corresponds to a configuration instance which is invalid. If the user wants to insist on the last choice made, he has really got problems if he works with the prior art systems, as will be explained below.

One attempt to solve the problem is that the user, without help from the system, must undo a number of previously made choices. A method would be first to delete the last but one choice and thereafter the last choice but two, etc. This is not a useful method, because the user might have made e.g. 50 choices and he has no guarantee that he will not have to go back to one of the first choices made in order to obtain allowance of the last choice he made and which he really wants.

U.S. Pat. No. 5,515,524, issued May 7, 1996, describes a configuration system which does not solve the problem mentioned above but only suggests that some removal of previous choices must be done.

Another method would be to allow the user to violate some of the constraints and thereby "walk outside the valid configuration space" for some time and hope that it is possible to get in again, even if it is most likely that the user will find himself trapped. There is no guarantee that the user will come back into the valid configuration space, and furthermore the changes which the user may attempt to do will after a couple of attempts not even correlate with his needs.

Reference can also be made to: A Tool for Developing Interactive Configuration Applications by Tomas Axling and Seif Haridi, The Journal of Logic Programming 1994:19, 20:1–679, page 19. This method proposes to solve the problem by extending the configuration model with information telling what to do in case the user insists on a choice which results in an invalid configuration instance. It is an enormous task to take just the most possible situation into account, and this prior art also teaches that situations leading to these problems should be avoided.

It will therefore be understood that there is a great need for solving the problems arising when the user insists on a choice which, together with the choices made so far, correspond, to an invalid configuration instance.

CROSS REFERENCES

A reference is made to the following patent applications, filed on the same day as this application and assigned to the same assignee, Beologic A/S:
(1) A Method of Configuring a Set of Objects in a Computer
(2) A Method and Apparatus for Inference of Partial Knowledge in Interactive Configuration
(3) Method of Processing a Request to a Boolean Rule
(4) Interactive Configuration via Network which are hereby incorporated as references to be understood in connection with the present invention.

SUMMARY OF THE INVENTION

The object of the invention is to provide an interactive computer configuration system which allows interactive selection with immediate removal of invalid selections and addition of derived selections made by the system.

A further object is to provide a sales-aid-system enabling the user not only to make choices but also to undo choices according to relevant alternatives presented to him by the interactive configuration computer system.

A further object is to provide a sales configuration system where alternatives proposed by the system for undoing of a choice can not only be neglected by the user, but it is also possible for the user to make a cardinal selection so that relevant alternatives presented thereafter will prioritize the customer's requirements and render a valid configuration easy and quick.

A further object is to implement the above-mentioned features in a very efficient way tailored to the special ability of a computer to make logical operations.

According to the invention a method is provided for interactive configuration wherein the user makes choices of elements, the validity of which is confirmed successively by means of a configuration engine system comprising a configuration model defining mutual predefined relations between selectable elements and comprising programs for validating a set of choices against said configuration model, and wherein a contradiction between a preferred choice made by the user a nd a number of predetermined valid configuration instances established by the inference engine system occurs, the improvement being that an alternative investigation system is activated for providing to the user a number of system generated user relevant possibilities of undoing previous choices, thereby obtaining for each possible set of undoing of choices a respective valid configuration instance comprising said preferred choice.

The time taken to complete a product configuration is significantly reduced by providing relevant proposals for alternatives automatically. This ensures that the sales person will not end up in a situation where he cannot propose a solution to the customer. The customer's requests are given without a preference, and they are often logically conflicting, mutually or against the configuration model comprised in the configuration engine. The use of the alternative investigation system helps the sales person to exploit a previously obtained accept from the customer so that the customer should only be presented with a small number of changes if he chooses to insist on a choice which is important to him. E.g. if the customer has made many decisions as to the look of his new car and the accessories wanted by him, and it suddenly turns out that with the present configuration instance it is not possible to choose exactly such wheel rims which he really wants, he will be disappointed. The invention makes it possible very quickly to see which previously made choices must be undone to obtain a valid configuration instance comprising exactly the wheel rims wanted.

The invention comprises not only undoing of choices, but enables the user, during the process, to make selected or discarded elements a cardinal choice so that an optimum number of the user's preferred or cardinal choices will be comprised in the final configuration. Thereby, the sales situations will appear professional, and the customer's confidence in the product to be purchased will be enhanced.

Some very experienced salesperson knowing almost by heart a relatively simple configuration model might interact with a prior art system and satisfy the customer without arriving at dead ends. However, in practice it is not possible for any salesperson to learn even simple configuration models entirely, because the configuration model will change rapidly due to the fast coming-up and leaving of new goods. In the future, sales configuration systems will appear more and more on the Internet so that customers are left without any help from skilled salesmen. In such a situation the invention will be a mandatory tool because an unskilled person ending up with an invalid configuration instance will give up in case he works with a prior art system, whereby he will gain an animosity against the product.

Further, the invention relates to a computer readable medium encoded with a program for performing the method as described above.

BRIEF DESCRIPTION OF THE DRAWINGS

FIG. 5 illustrates the explanation given in connection with FIGS. 3 and 4, and FIGS. 6A, 6B, 6C, 6D, and 6E indicate user information given in connection with an example for configuring a computer system.

DESCRIPTION OF A PREFERRED EMBODIMENT

Figure 1:
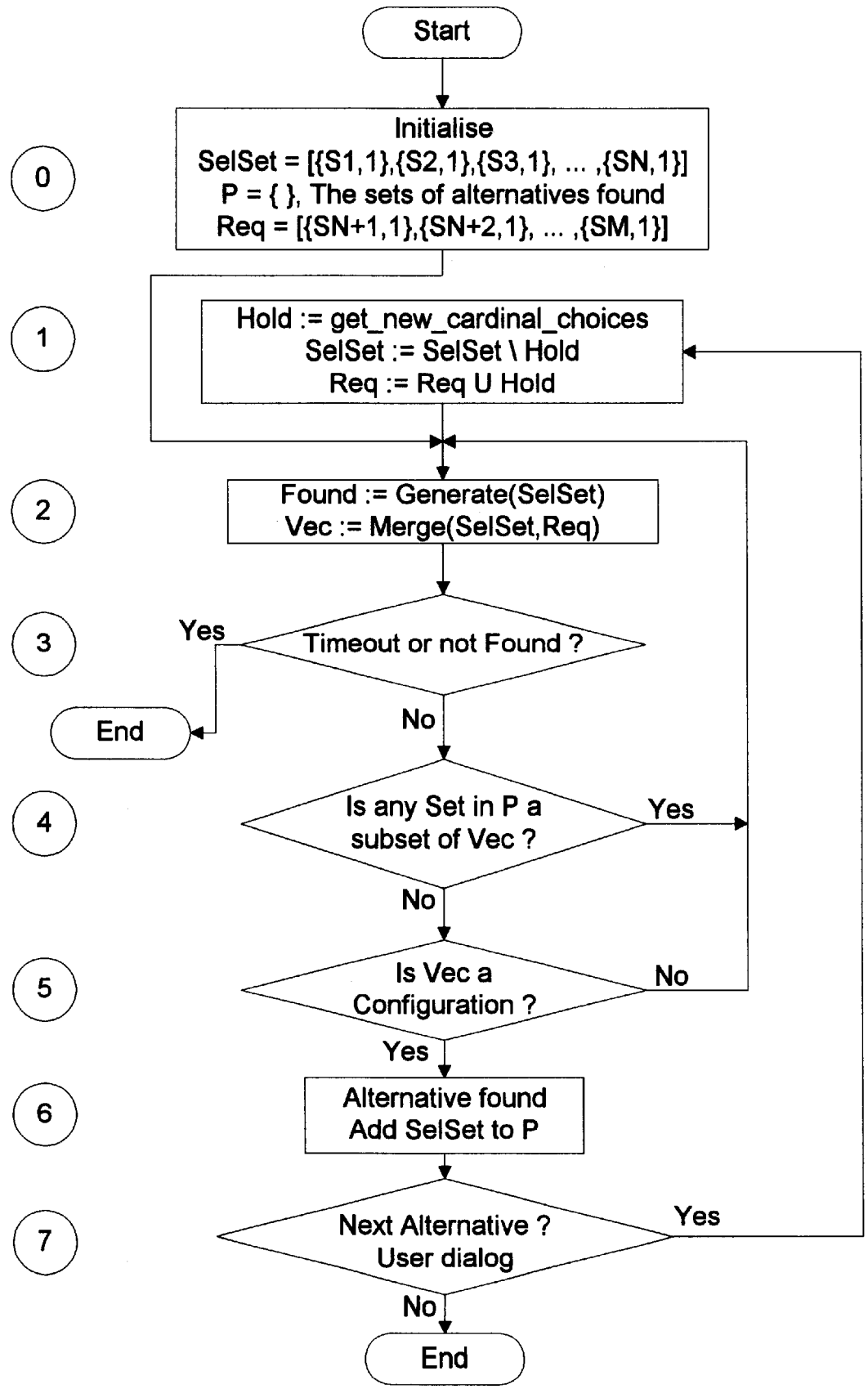
FIG. 1 shows a flow chart relevant to the explanation of a preferred embodiment according to the invention.

First, an example will be given together with the explanation of the terms used in the following description.

Model, engine, trim and paint (and many others) are called objects. Each object comprises a number of selectable elements:
Model {Sedan, Station car, Cabriolet}
Engine {2.0, 3.0, 4.0}
Paints {Blue, Red, Green, Purple}
Trim {Velvet, Leather}

Within the object Model [Sedan] is an element which can either be selected or discarded. A selection or discarding is called a choice in the following, and, as will be explained in more detail later, a choice can be undone or a choice can be made a cardinal choice. The advantage of this will become clear later.

First, it should also be explained what is meant by the term: rules. Rules may look like this:
(1) Model[sedan]→Engine[4.0] or not Trim [Leather]
(2) Paint[Red]→Model[Cabriolet]
(3) Engine[4.0]→Paint[Red]
(4) Trim[Velvet]→Paint[Purple] or Paint[Blue]

Rule (1) says that Model [Sedan] implies either a 4.0 engine or that leather could not be chosen for the trim. In practice, a configuration engine comprises a large number of rules, and combined with a great number of objects—each object may comprise many elements—it will be understood that the configuration problem can be enormous.

Assuming a user has discarded Purple and Blue paints and selected Model[Sedan] and Trim[Leather]. The user now tries to select Engine[3.0]. This results in an inconsistent configuration according to the rules. By insisting on his last choice, with this invention, the user is presented with a number of relevant proposals of choices which must be undone for the configuration to be in a consistent state.

Assuming that the user insists on engine [3.0] even if this selections results in an inconsistent configuration, the following set of relevant proposed undoing of choices will be presented to the user:
A1:: {Model[Sedan]}
A2:: {Trim[Leather], !Paint[Purple]} (! is a symbol for NOT)

A3:: {Trim[Leather], !Paint[Blue]}]

A1 means even if the model [Sedan] has previously been selected, the alternative investigation system according to the invention proposes to undo this choice. If the user accepts this proposal, the consequence will be the following alternative partial configuration:

C1:: !Paint[Purple], !Paint[Blue], Trim[Leather], Engine [3.0]

If one of the proposals A2 or A3 is chosen, the valid alternative partial configurations will be:

C2:: !Paint[Blue], Model[Sedan], Engine[3.0]
C3:: !Paint[Purple], Model[Sedan], Engine[3.0]

Of course, any other set of proposals for undoing of choices represents corresponding alternative partial configurations. These are, however, not relevant, as the user can always undo any choices on his own initiative. For instance the proposal A4::{!Paint[Purple], Model[Sedan]} does not present the user with any options he did not have with the minimal proposal. In other words, if a set of proposals, which is a subset of another set of proposals, exists, then the larger set is irrelevant. Here it is easy to verify that A1 ⊂ A4.

Alone the irrelevant proposals containing Model[Sedan] amount to seven different sets of proposals, namely:

A4:: {!Paint[Purple], Model[Sedan]}
A5:: {!Paint[Blue], Model[Sedan]}
A6:: {Trim[Leather], Model[Sedan]}
A7:: {!Paint[Purple], Trim[Leather], Model[Sedan]}
A8:: {!Paint[Blue], Trim[Leather], Model[Sedan]}
A9:: {!Paint[Purple], !Paint[Blue], Model[Sedan]}
A10:: {!Paint[Purple],!Paint[Blue], Trim[Leather], Model [Sedan]}

The strategy for presenting proposals is that if a subset of a set of proposals has already been presented as a previous set, this "new" set is in fact not relevant.

According to the invention only relevant sets of proposals are presented to the user so that it is very easy to have an overview of the situation. Also according to the invention, the sets of proposals for undoing choices are presented in a user-friendly manner, because the sets first presented comprise undoing of the least possible number of choices and the later proposed sets propose undoing of a greater number of previous choices. Of course, in a sales situation the user will be interested in keeping as many choices as possible unamended. This is obtained with the invention.

Furthermore, with this invention, a user can insist on a number of choices making these choices his cardinal choices. For instance, by insisting on leather trimming as well as a 3.0 engine, the set of relevant proposals is now only [{Model [Sedan]}]. From a user's point of view, the larger the number of cardinal points he is able to specify, the more relevant the presented proposals for undoing of previous choices are.

A Preferred Representation

The choices are represented in a vector each associated with a value 0 or 1, representing if a choice must be undone or not. Recalling the configuration Cl from before, this configuration is then represented as the following choice-vector {{[!Paint[Purple],1], [!Paint[Blue],1], [Model[Sedan],0], [Trim[Leather],1],[Engine[3.0],1]}, In the algorithm for finding proposals for undoing of choices and corresponding alternatives, this choice vector is split into a SelSet, which is a choice vector from which choices can be undone (1 is amended to 0). Cardinal choices are separated into a choice vector Req, where all entries are 1.

An alternative corresponds to a valid choice vector comprising both SelSet and Req. The alternatives from the example above are then represented as the following set of choice-vectors:

VC1
{{[!Paint[Purple],1], [!Paint[Blue],1], [Model[Sedan],0], [Trim[Leather],1],[Engine[3.0],1]}, VC2
{[!Paint[Purple],0], [!Paint[Blue],1], [Model[Sedan],1], [Trim[Leather],0], [Engine[3.0],1]}, VC3
{[!Paint[Purple],1], [!Paint[Blue],0], [Model[Sedan],1], [Trim[Leather],0]}, [Engine[3.0],1]}

Recalling the irrelevant set of proposals A7, now represented as a choice vector.

{[!Paint[Purple],0], [!Paint[Blue],1], [Model[Sedan],0], [Trim[Leather],0], [Engine[3.0],1]}

In terms of choice vectors this set of proposals is irrelevant, because a previous set has a subset of 0's of the irrelevant vector. Determining whether a choice vector is irrelevant is now a question of calculating whether one choice vector contains a subset of 0's of another. This can be done by the following formula:

$$\text{Subset}(C1,C2) := ((C1.V \text{ xor } C2.V) \text{ and } C2.V) == 0 \text{—is } C1 \text{ a subset of } C2$$

where C.V is a binary number. We can verify that the irrelevant set is in fact irrelevant by comparing it with the first set. If the computation returns True, this is the case.

```
Subset(A1,A7)  :=
Subset (
  {[!Paint[Purple],1], [!Paint[Blue],1], [Model[Sedan],0],
   [Trim[Leather],1], [Engine[3.0],1]},
  {[!Paint[Purple],0], [!Paint[Blue],1], [Model[Sedan],0],
   [Trim[Leather],0], [Engine[3.0],1]}
):=True
Because: ((11011 xor 01001) and 01001) == 0
         ⇔
         10010 and 01001 == 0
         ⇔
         00000 == 0
         ⇔
         True
```

Note that by using the representation of choice vectors we are able to perform the subset operation in terms of "xor" and "and" operations, which means that this invention exploits what a computer does best. Also note that the final comparison "0000==0" is not a binary operation, rather a check whether the left hand side of "==" contains any 0's.

According to the invention the user can make a choice cardinal. Suppose that the user, after having been presented with the set of proposals for undoing of choices, chooses to have Trim[Leather] as a cardinal choice. According to the invention this is done by removing Trim[Leather] from SelSet and adding it to Req. Consequently, the representation at this point in the example is as follows:

The set of cardinal choices is now:
{[Trim[Leather],1],[Engine[3.0],1]}
and the set of alternatives has shrunk to only one choice vector:
{{[!Paint[Purple],1], [!Paint[Blue],1], [Model[Sedan],0], [Trim[Leather],1]}}

It can be seen that the features of the invention are very effective. Not only are the irrelevant set of proposals A4–A10 not presented to the user, but due to the fact that Trim[Leather] can be made a cardinal choice only one single proposal of an alternative is relevant. It can be seen that the user very quickly obtained a solution comprising leather trim and a 3.0 engine which was important to him.

A Preferred Method of Implementing the Invention

Reference will now be made to FIG. 1 showing a flow chart where:

Req is a choice vector with all entries 1 representing the set of selected and discarded object values which a user has requested as cardinal points.

Selset is a choice vector representing the set of selected and discarded object values that are not cardinal points. Selset and Req must be disjointed.

Hold is a set of selected and discarded object values, which a user has requested as further cardinal points.

P is the set of alternatives, i.e. a set of choice-vectors.

Get_new_cardinal_points? Enables the user to add further cardinal points.

Merge (Req,SelSet) merges the choices in Req and SelSet, such that the resulting choice vector has as its first component the first choice, as the second component the second choice, etc. The result is stored in a temporary choice vector Vec.

The different steps in the flow chart will first be explained in general, and later an example of configuring a computer system will be explained in detail related to the steps in the flow chart.

(0) To begin with, SelSet represents the choices successively made by the user until a new choice made by the user results in a corresponding invalid configuration instance. If the user insists on the last mentioned choice, the choice is said to be preferred and will be incorporated in Req. No alternatives have been found yet, and hence P is empty.

Found (2) means that a new SelSet is generated. The generation is preferably made according to the flow chart shown in FIGS. 3 and 4, which will be explained later in more detail. What actually happens is that a specific choice in SelSet is undone, and it should be checked whether such choices combined with the preferred choice correspond to a valid configuration instance. Therefore, SelSet and Req are merged, but before the corresponding configuration is checked by the inference engine (5), it is checked (4) whether the corresponding alternative is relevant. If so, and if it corresponds to a valid configuration instance, a new relevant alternative is found and the corresponding SelSet is added to P.

Now the user must decide if he wants more proposals corresponding to further alternatives (7), and the user is now allowed to appoint cardinal choices. If so (1the cardinal choice is removed from SelSet and incorporated in Req.

Figure 2:
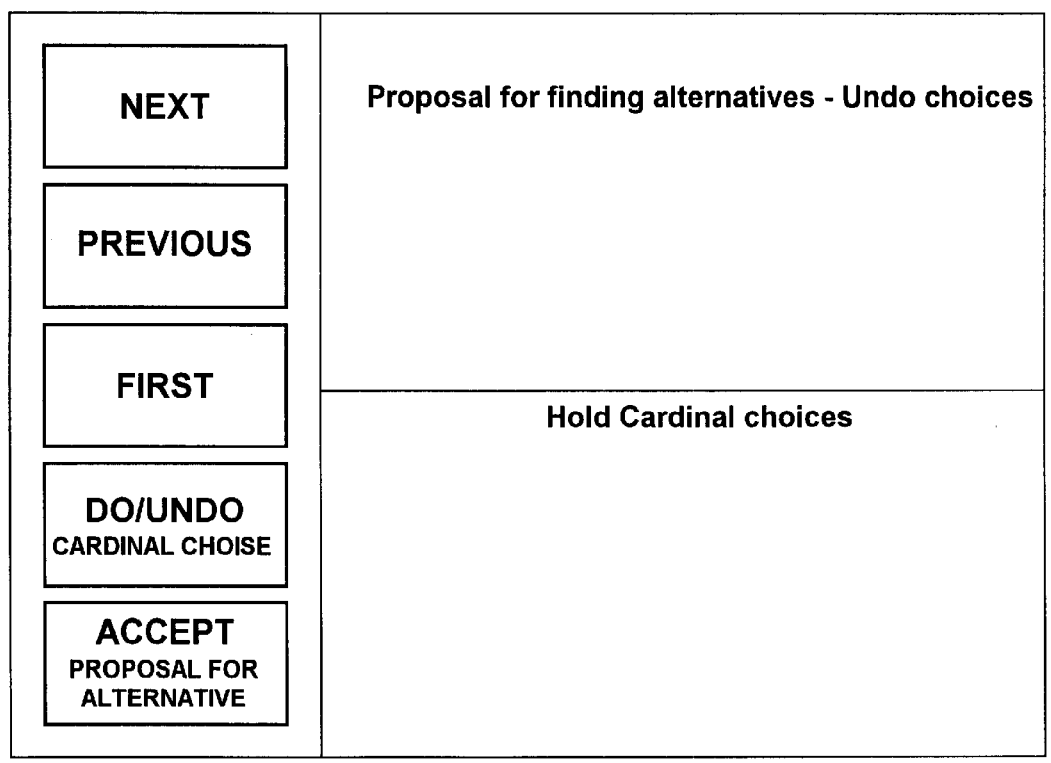
FIG. 2 shows a window arranged for presentation on a computer screen for implementing user communication with the interactive configuration computer system according to the invention.
Figure 3:
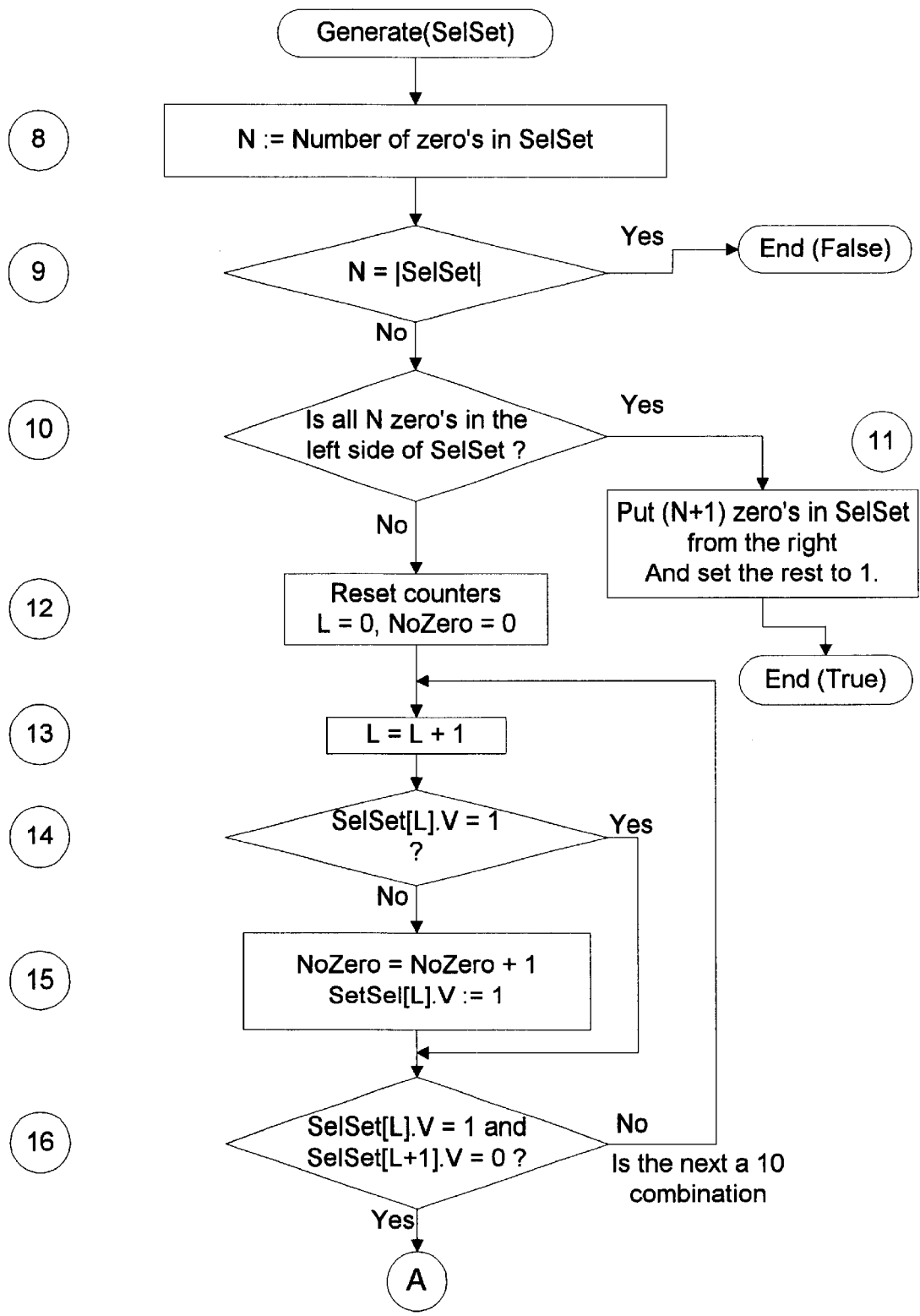
FIG. 3.
Figure 4:
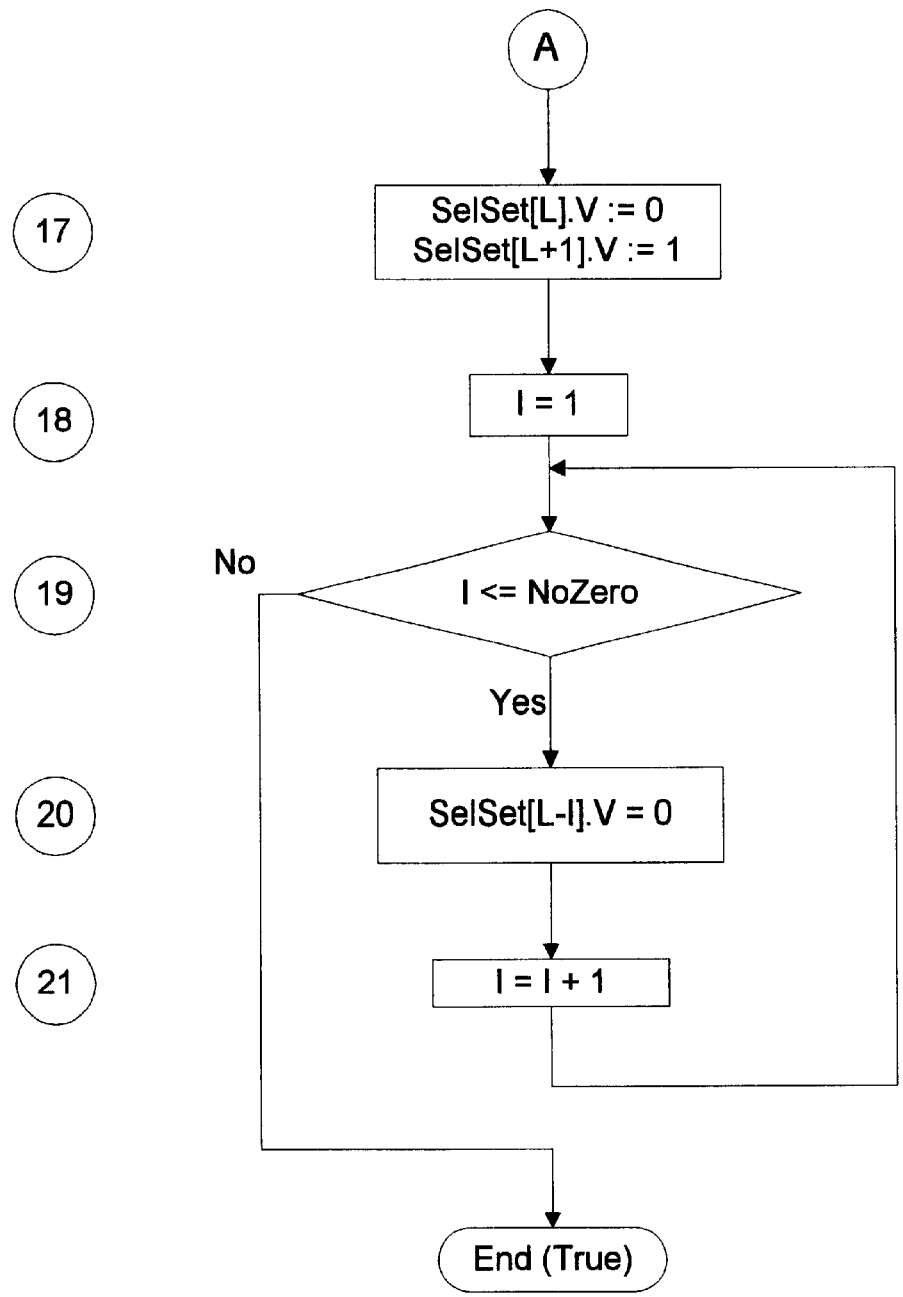
FIG. 4 show a flow chart relating to the method explained in connection with FIG. 1.

Before the flow chart in FIGS. 3 and 4 is explained in more detail, it is important to emphasize the effect of the invention as seen from a user's point of view. This can be understood with reference to FIG. 2 which represents a window coming up on a computer screen when the alternative investigation system according to the invention is started. The user dialogue mentioned in (7) in FIG. 1 may also be related to the window in FIG. 2.

In the example previously given where the user insists on engine [3.0], it was mentioned that the alternative investigation system, according to the invention, would provide three sets of relevant proposals for undoing of choices. According to the invention the user dialogue will progress so that when clicking on NEXT, only A1 will be shown, i.e. the user will be informed that if he would like to undo model [Sedan], an alternative configuration would be valid (according to C1). The further proposals for alternatives (A2, A3) are not immediately shown in the window from FIG. 2, unless the user asks for the NEXT proposal for alternatives. The system will automatically begin to display those proposals comprising the lowest possible number of choices to be undone. Further, the user may activate PREVIOUS and FIRST and thereby move around among the proposed alternatives.

These features are very expedient to the user, because no customer wants to undo his previous choices if he can avoid doing so. On the contrary, starting by presenting the user with a proposal for undoing many previous choices, will be dissatisfactory to the user.

When the user accepts a proposal for an alternative, the method described in FIG. 1 will go from (7) to END.

Another aspect of the invention is, as previously described, that irrelevant proposals are left out. This means that when the user asks for the NEXT proposal to find alternatives, the proposals A4–A10 will not be shown, since they do not contribute to solving the problem better than already proposed. This is very convenient to the user, because, if the irrelevant proposals were shown, the user would move around among a lot of proposals and would lose his overview.

A further user-friendly aspect according to the invention is the possibility of doing cardinal choices. Reference is made to the example above where the user wants the engine [3.0] and is presented with proposals for alternative configurations. During a process when the user is presented with the possibility of undoing Trim [Leather], he may decide to insist on this choice too, and make it a cardinal choice by clicking on the icon in the window in FIG. 2 when the proposals A2 or A3 are shown in the window. Thereafter, the alternative investigation system finds out that only one proposal for alternatives is left, as previously explained, and this will be presented to the user on the screen together with the original choice insisted on, Engine [3.0] and the cardinal choice later decided on, Trim [Leather].

Now, a more detailed description of Generate(SelSet) from (2) in FIG. 1 will be given with reference to FIGS. 3 and 4.

This routine is arranged to provide for every possible undoing of previously done choices, but in a very special way so that first all valid proposals presupposing only one choice to be undone are first generated, and secondly all possible combinations comprising undoing of two choices are found, etc. The detailed function will be explained below with reference to FIG. 5.

The algorithm Generate make all the combinations that can be made for N selections, that is $2^N$ alternatives. The zero's represent those selections that are not alternatives and thus have to be neglected. The algorithm Generate does not give the combinations in normal counting order, e.g. for N=5: 00000, 00001, 00010, 00011, . . . (that is 0,1,2,3, . . . )

Since the goal is to find the alternatives with the largest number of selections preserved, the counting order has to give the combinations with one zero, then those with two zeros, etc. That is, for N=5, the following combinations: 11111, 11110, 11101, 11011, 10111, 01111, 11100, 11010, 10110, . . . , 01000, 10000, 00000 (that is 31, 30, 29, 27, 23, 15, 28, 26, 22, . . . , 8, 16, 0).

This order of combinations is generated by the algorithm Generate, as shown in FIGS. 3 and 4. The algorithm takes a combination and generates the succeeding combination corresponding to the list shown above.

In the following the algorithm is described by way of an example. The example uses a string with a number of black and white pearls as an illustration. The white pearls represent zeros and the black pearls represent ones.

The algorithm Generate is called, using the variable SelSet which is a vector, i.e. a string of pearls, containing the last combination generated. In the initial call the SelSet contains the string shown in FIG. 5a (only black pearls).

In step (8) the number of white pearls on the string is determined. This number is of interest as the succeeding combination must either contain the same number of white peals or an additional white pearl. In step (9) it is determined whether the last combination has already been generated or not, i.e. whether the input consists of white pearls only. The variable N is assigned the value corresponding to the number of white pearls on the string. If all the combinations have been generated, the algorithm stops and returns the value 'false'. If, on the other hand, more combinations are to be generated, the algorithm continues in step (10).

In step (10) the algorithm determines whether all the white peals are placed in the leftmost positions of the string. If this is the case, the algorithm continues in step (11), otherwise it continues in step (12). The reason for this check will be discussed below. It is noted that the start situation, where the string only contains black pearls, is interpreted as a situation where all the white pearls are placed in the leftmost positions of the string, i.e. the algorithm will continue in step (11) in this situation.

In step (11) the rightmost pearl is exchanged with a white one, resulting in the string shown in FIG. 5b. The combination that has been generated is returned by the algorithm, which also returns the value 'true' and stops.

In the situations, where the algorithm continues in step (12), i.e. not all the white pearls in the previous combination are located in the leftmost positions, the next combinations are generated by successively moving the white pearl one position to the left. This functionality is achieved by performing a pattern matching from the left side of the string to identify the sequence '•o', and when found, substituting it by the sequence '•o'. The white pearl is hereby moved one step to the left. The pattern matching and the succeeding substitution are made in the loop comprising the steps (12,13,14, 16, and 17). In step (12) the counters L and NoZero are initialized to zero. The counter L is used as an index to the SelSet vector, i.e. the string of peals. In step (13) the index is increased by one in order to point at the next pearls in the string. Initially L is increased to one in order to index the first pearl. The variable NoZero will be discussed later on.

In step (14) the color of the index pearl is determined. If it is black, the algorithm continues in step (16) where it is determined whether the indexed pearl is black and whether the following pearl is white. If this is not the case, the algorithm continues in step (13) where the variable L is increased by one. In this way, the loop will perform a scanning of the string looking for the pattern '•o'. If the pattern '•o' is found, the algorithm continues in step (17) where the found pattern is replaced by the pattern '•o'. The resulting combination is shown in FIG. 5c.

In step (18) the variable I is set to 1, and as the variable NoZero is zero, the algorithm will end. The combination shown above is therefore the combination to be returned.

The next combinations are generated in the same way, i.e. a generated combination will have a single white pearl, which is positioned one position to the left compared to the previously generated combination. The following combination is shown in FIG. 5d. As the following combination is generated in the same way, i.e. with the white pearl moving one step to the left from one combination to the next, these combinations are not shown. FIG. 5e shows the last combination with one white pearl.

In the situation where the input string SelSet looks like the last combination, the next combination is generated in the following way.

As all the white pearls (the only one) are placed in the leftmost position of the string, step (11) will follow step (10), and this will result in the combination shown in FIG. 5f.

Similar to the generation of the combinations described above, the next pattern that will be generated looks like the one shown in FIGS. 5g–5j. That is, the leftmost white p earl will move to the left as a result of the pattern search and the pattern substitution performed in the steps (13, 14, 16 and 17).

The next combination is generated as a result of the question asked in step (14), where it is determined whether the indexed pearl is black. As the leftmost pearl is white in this situation, the algorithm will continue in step (15). In step (15) the white pearl will be replaced by a black pearl and the variable NoZero is increased by one, indicating that an additional white pearl has been replaced by a black pearl.

This action is followed by the search for the pattern '•o' followed by the substitution as described above. When the pattern match is found, and there has to be one, since, otherwise, the algorithm would have found that all white pearls are at the left side, then the collected white pearls are put back in the string immediately to the left of the white pearl in the substitution pattern. This is done by performing the steps (18, 19, 20, and 21), as described in the following.

After the pattern '•o' is found, it is substituted by the pattern '•o' (step 17). As the variable NoZero was increased in step (15) when the white pearl was replaced by a black pearl, the algorithm will continue to step (20) after the steps (18) and (19). In step (20) all the white peals that have been replaced with black pearls in step (15), are placed to the left of the white pearl that has just been substituted. This results in the combination shown in FIG. 5k.

The following combinations are generated in the same way as described above, i.e. the leftmost white pearl is successively moved to the left, resulting in a number of combinations illustrated by FIG. 5g to FIG. 5k.

After this combination in FIG. 5h the following combination will be generated in step (11), as all the white pearls are placed in the leftmost positions resulting in the combination shown in FIG. 5l.

Now the pattern matching is used to move the leftmost white pearl to the left in more steps, thereby generating the following combinations. The following combinations are generated in a way similar to the one described above. The last combination is the one consisting of white pearls only.

Now an example for configuring a computer will be given, having an example with the discrete variables constrained with this expression $$A+B+C+D+E+S<=7$$

All the variables have the domain from 0 to 7. The variables can be taken as different SCSI options in a computer (Harddisk, CDROM, TapeStation, etc.) that are restricted by the fact that at most there may be seven SCSI options in the entire system.

Imagine that A is selected to 4 and B,C,D to 1 this will cause the S and E to be deduced to zero (S=0). The deduction is done by the inference engine and is not a part of the present invention.

Now the user wants to insist on three of S (S=3), and the alternative investigation system is started. In the following, reference will be made to FIG. 1 in which the left hand digits correspond to the left hand digits below.

(0)
    SelSet = [{A[4],1}, { B[1],1}, {C[1],1}, {D[1],1}]
    P = {}
    Req = {S[3]}
(2)
    Found = TRUE
    SelSet = [{A[4],1}, { B[1],1}, {C[1],1}, {D[1],0}]
    P = {}
    Req = {S[3]}
    Vec = [{A[4],1}, { B[1],1}, {C[1],1}, {D[1],0}, {S[3],1}]
(3)
    NO
(4)
    NO (since P = {})
(5)
    NO
(2)
    Found = TRUE
    SelSet = [{A[4],1}, { B[1],1}, {C[1],0}, {D[1],1}]
    P = {}
    Req = {S[3]}
    Vec = [{A[4],1}, { B[1],1}, {C[1],0}, {D[1],1}, {S[3],1}]
(3)
    NO
(4)
    NO (since P = {})
(5)
    NO
(2)
    Found = TRUE
    SelSet = [{A[4],1}, { B[1],0}, {C[1],1}, {D[1],1}]
    P = {}
    Req = {S[3]}
    Vec = [{A[4],1}, { B[1],0}, {C[1],1}, {D[1],1}, {S[3],1}]
(3)
    NO
(4)
    NO (since P = {})
(5)
    NO
(2)
    Found = TRUE
    SelSet = [{A[4],0}, { B[1],1}, {C[1],1}, {D[1],1}]
    P = {}
    Req = {S[3]}
    Vec = [{A[4],0}, { B[1],1}, {C[1],1}, {D[1],1}, {S[3],1}]
(3)
    NO
(4)
    NO (since P = {})
(5)
    YES
(6)
    P = {[{A[4],0}, { B[1],1}, {C[1],1}, {D[1],1}, {S[3],1}]}
(7)
    Proposal for alternative found. (Presented to user in user dialogue, see FIG. 6.)
    [{A[4],0}, { B[1],1}, {C[1],1}, {D[1],1}]
    NextAlternative?    YES
(1)
    Hold = {}
    SelSet = [{A[4],0}, { B[1],1}, {C[1],1}, {D[1],1}]
        Req = {S[3]}
(2)
    Found = TRUE
    SelSet = [{A[4],1}, { B[1],1}, {C[1],0}, {D[1],1}]
    P = {[{A[4],0}, { B[1],1}, {C[1],1}, {D[1],1}] }
    Req = {S[3]}
(3)
    NO
(4)
    Subset(SelSet,P) := ((1100 xor 0111) and 1100) = 0
        := (1011 and 1100 = 0))
        := FALSE
    NO
(5)
    Configuration = NO
(2)
    Found = TRUE SelSet = [{A[4],1}, { B[1],0}, {C[1],1}, {D[1],0}]
    P = {[{A[4],0}, { B[1],1}, {C[1],1}, {D[1],1}] }
    Req = {S[3]}
(3)
    NO
(4)
    Subset(SelSet,P) := ((0111 xor 1010) and 1010) = 0
        := FALSE
    NO
(5)
    Configuration = NO
(2)
    Found = TRUE
    SelSet = [{A[4],0}, { B[1],1}, {C[1],1}, {D[1],0}]
    P = {[{A[4],0}, { B[1],1}, {C[1],1}, {D[1],1}]}
    Req = {S[3]}
(3)
    NO
(4)
    Subset(P,SelSet) := ((0111 xor 0110) and 0110) = 0
        := 1001 and 0110 = 0
        := TRUE
    YES
(2)
    Found = TRUE
    SelSet = [{A[4],1}, { B[1],0}, {C[1],0}, {D[1],1}]
    P = {[{A[4],0}, { B[1],1}, {C[1],1}, {D[1],1}] }
    Req = {S[3]}
(3)
    NO
(4)
    Subset(P,SelSet) := ((0111 xor 1001) and 1001) = 0
        := FALSE
    NO
(5)
    Configuration= NO
(2)
    Found = TRUE
    SelSet = [{A[4],0}, { B[1],0}, {C[1],1}, {D[1],1}]
    P = {[{A[4],0}, { B[1],1}, {C[1],1}, {D[1],1}] }
    Req = {S[3]}
(3)
    NO
(4)
    Subset(P,SelSet) := ((0111 xor 0011) and 0011 = 0))
        := TRUE
    YES
(2)
    Found = TRUE
    SelSet = [{A[4],1}, { B[1],0}, {C[1],0}, {D[1],0}]
    P = {[{A[4],0}, { B[1],1}, {C[1],1}, {D[1],1}] }
    Req = {S[3]}
(3)
    NO
(4)
    Subset(P,SelSet) := ((0111 xor 1000) and 1000 = 0))
        := FALSE
    NO
(5)
(6)
    Configuration = YES
    P = {[{A[4],0}, { B[1],1}, {C[1],1}, {D[1],1}],
        [{A[4],1}, { B[1],0}, {C[1],0}, {D[1],0}] }
(7)
    Second proposal for Alternative found. (Presented to user in user dialog, see FIG. 6)
    [{A[4],1}, { B[1],0}, {C[1],0}, {D[1],0}]
    Next alternative?    NO If the user had chosen to proceed, the rest would be found to be subsets of the two selections already found and the algorithm would terminate, telling the user that no further alternatives could be found. With reference to FIGS. 6a–6e an embodiment of a user dialogue in connection with the above example will now be explained.

As explained above, the previous choice A=4 has already been made, and now the user wants to select S=3. This choice is checked in the inference engine where the corresponding configuration instance is found to be invalid. Thereafter, the alternative investigation system according to the invention will start according to the method described in connection with FIG. 1, and the window in FIG. 6a will be shown on the screen, telling that S=3 is deemed to be a cardinal choice, and the user is asked whether he wants the system to generate a proposal for an alternative configuration comprising S=3.

Figure 6B:
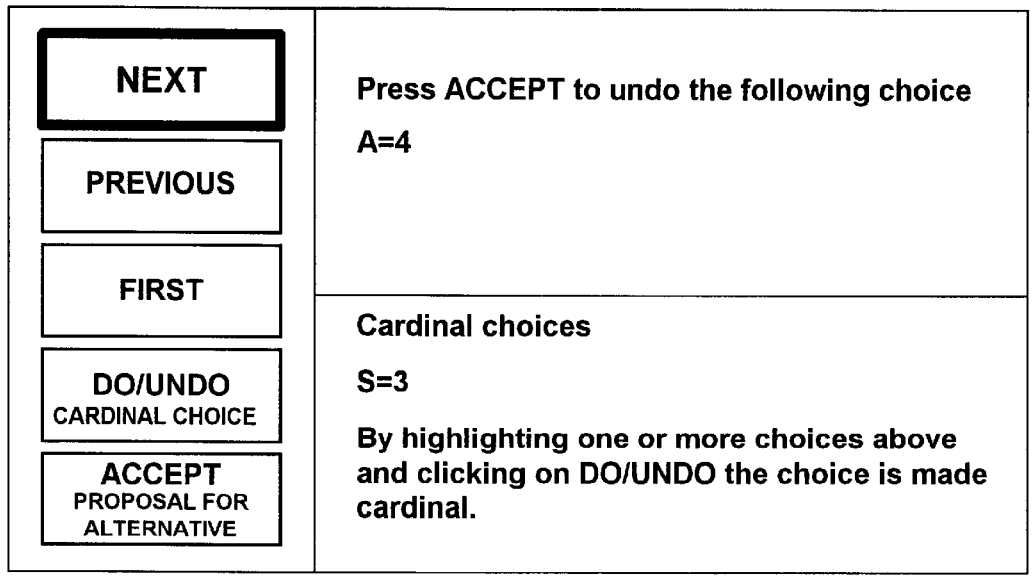

If the user clicks on the icon NEXT, the window in FIG. 6b will be shown, saying that an alternative valid configuration could be obtained if the choice A=4 is undone. The system also gives the user the possibility to do/undo further cardinal choices, e.g. A=4.

In the example given, the user chooses to click on NEXT, because he wants to be presented with further proposals for finding alternative configurations. Thereafter, the window in FIG. 6c will be shown proposing to the user to undo the choices (B=1; C=1; D=1), but in the example the user still clicks on NEXT however, as explained at the of the above example; in fact no more alternatives are communicated in the window FIG. 6d.

Figure 6C:
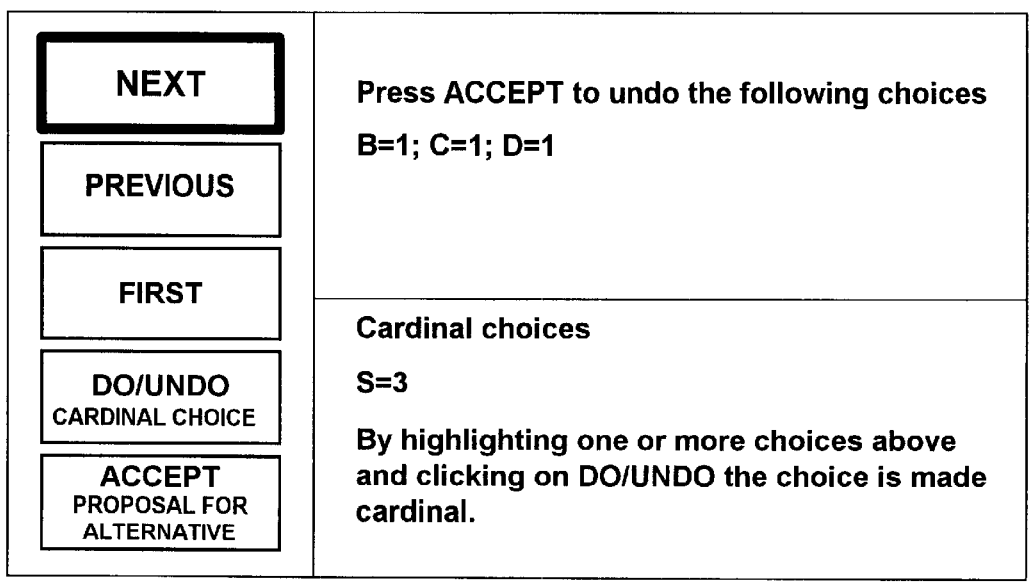
Figure 6D:
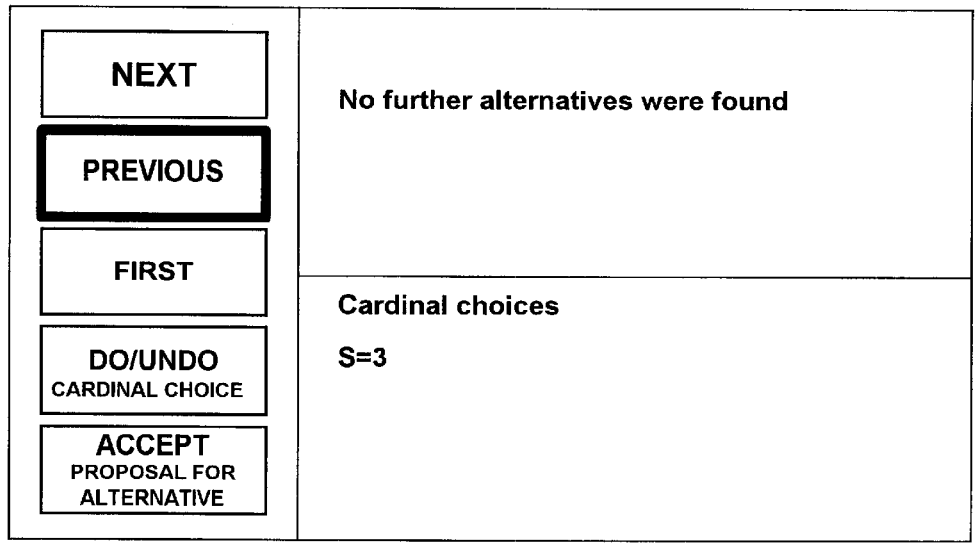
Figure 6E:
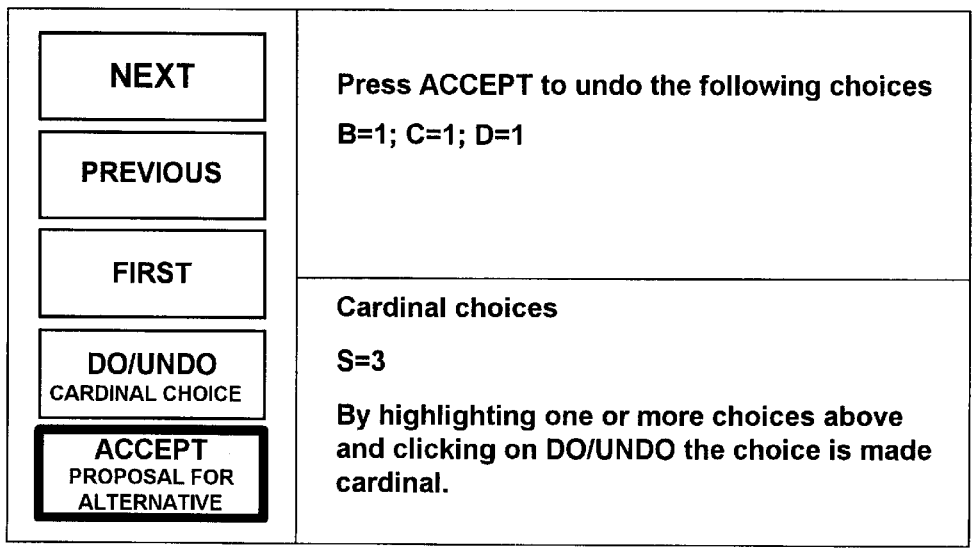

The user must now decide on what to do and clicks on PREVIOUS, and then the window in FIG. 6e will be shown, which corresponds to the window in FIG. 6c. If the user then decides to accept to undo the choices proposed in the window, the alternative investigation system has guided the user to obtain a configuration instance comprising A=4 and S=3.

It should be remembered that the example given above is a very simple example which, to enhance the understanding, is easy to grasp for a human being. In practice, configuration problems are huge problems without any clearness to human beings, but, the examples above demonstrates that huge configuration problems can easily be handled when the method according to the invention is used.

The invention may be embodied as a computer program or a part of a computer program, which may be loaded into the memory of a computer and executed therefrom. The computer program may be distributed by means of any data storage or data transmission medium. The storage media can be magnetic tape, optical disc, compact disc (CD or CD-ROM), mini-disc, hard disk, floppy disk, ferroelectric memory, electrically erasable programmable read only memory (EEROM), flash memory, EPROM, read only memory (ROM), static random access memory (SRAM), dynamic random access memory (DRAM), ferromagnetic memory, optical storage, charge coupled devices, smart cards, etc. The transmission medium can be a network, e.g. a local area network (LAN), a wide area network (WAN), or any combination thereof, e.g. the Internet. The network may comprise wire and wireless communication links. Via the network a software embodiment (i.e. a program) of the invention, or a part thereof, may be distributed by transferring a program via the network.

What is claimed is:

1. A method for interactive configuration wherein a user makes choices of elements thereby generating a selected set of choices,
    the validity of which is verified successively by a configuration engine against a configuration model defining relations to be satisfied between the elements,
    wherein a choice may result in a contradiction between the selected set of choices and the configuration model; and
    wherein, if a contradiction occurs, an alternative investigation system is activated for providing to the user a set of system generated alternatives to the selected set of choices, thereby obtaining for each alternative a respective valid configuration instance comprising a preferred choice.

2. A method according to claim 1, wherein alternative sets of choices are presented to the user in subsets, each subset defining a number of undoing choices needed for obtaining a respective configuration instance.

3. A method according to claim 1, wherein a system generated alternative presented to the user previously is excluded from subsequent system generated alternatives presented to the user.

4. A method according to claim 1, wherein the user, before the alternative investigation system is activated, is provided with an option of requesting cardinal choices which are choices that the user insists upon.

5. A method according to claim 4, wherein alternative sets of choices that are valid according to the configuration model and involves undoing of a cardinal choice are not presented to the user.

6. A method according to claim 4, wherein any choice can be made a cardinal choice.

7. A method according to claim 1, wherein choices may comprise selecting and discarding of elements and that a choice vector is generated comprising:
    a first choice vector part (SelSet) representing a set of selected and discarded elements enabled to be undone;
    a second choice vector part (Req) representing a set of selected and discarded elements not enabled to be undone;
    each element has an associated binary value where the elements belonging to Req have only one binary value associated, and the elements belonging to SelSet may have either of the binary values.

8. A method according to claim 7, wherein the alternative investigation system comprises an algorithm for successively undoing one of each of the choices of elements in SelSet and for checking the validity of the configuration instances corresponding to each respective choice vector against the configuration model, a found valid configuration instance corresponding to an alternative.

9. A method according to claim 8, wherein the choice vector is input to the configuration engine to determine whether the corresponding selected set of choices is valid.

10. A method according to claim 1, wherein the alternative investigation system performs the following steps:
    i) generating alternative sets of choices, each of which is made by undoing at least one choice in the selected set of choices,
    ii) verifying whether the alternative sets of choices are valid according to the configuration model,
    iii) providing to the user those alternative sets of choices that are valid according to the configuration model.

11. A method according to claim 10, wherein the alternative sets of choices are successively generated and wherein said undoing, verifying, and presenting to the user is repeated for each set of the alternative sets of choices.

12. A method according to claim 10, wherein this method is repeated for any combination of undoing one further choice together with a previous number of undoing of choices.

13. A method according to claim 12, wherein an alternative comprising undoing of a choice of any element is relevant only if none of said elements is undone in a previous found set of undoing of choices of elements.

14. A computer readable medium encoded with a program for performing an alternative investigation method wherein a user makes choices of elements thereby generating a selected set of choices, the validity of which is verified successively by a configuration engine against a configuration model defining relations to be satisfied, between the elements, wherein a choice may result in a contradiction between the selected set of choices and the configuration model; and wherein, if a contradiction occurs, an alternative investigation system is activated for providing to the user a set of system generated alternatives to the selected set of choices, thereby obtaining for each alternative a respective valid configuration instance comprising a preferred choice.

15. A computer readable medium according to claim 14, wherein alternative sets of choices are presented to the user in subsets, each subset defining a number of undoing choices needed for obtaining a respective configuration instance.

16. A computer readable medium according to claim 14, wherein the alternative investigation system performs the following steps:

iv) generating alternative sets of choices, each of which is made by undoing at least one choice in the selected set of choices, v) verifying whether the alternative sets of choices are valid according to the configuration model, vi) providing to the user those alternative sets of choices that are valid according to the configuration model.

17. A computer readable medium according to claim 16, wherein the alternative sets of choices are successively generated and wherein said undoing, verifying, and presenting to the user is repeated for each set of the alternative sets of choices.

18. A computer readable medium according to claim 16, wherein this method is repeated for any combination of undoing one further choice together with the previous number of undoing of choices.

19. A method according to claim 10, wherein the alternative sets of choices are presented to the user in an order according to an increasing number of undoing choices.

20. A computer readable medium according to claim 14, wherein the alternative sets of choices are presented to the user in an order according to an increasing number of undoing choices.

21. A computer readable medium according to claim 14, wherein the user, before the alternative investigation system is activated, is provided with an option of requesting cardinal choices which are choices that the user insists upon.

22. A computer readable medium according to claim 21, wherein alternative sets of choices that are valid according to the configuration model and involves undoing of a cardinal choice are not presented to the user.

23. A computer readable medium according to claim 21, wherein any choice can be made a cardinal choice.

24. A computer readable medium according to claim 14, wherein a system generated alternative presented to the user previously is excluded from subsequent system generated alternatives presented to the user.

25. A computer readable medium according to claim 14, wherein choices may comprise selecting and discarding of elements and that a choice vector is generated comprising:

a first choice vector part (SelSet) representing a set of selected and discarded elements enabled to be undone;

a second choice vector part (Req) representing a set of selected and discarded elements not enabled to be undone;

each element has an associated binary value where the elements belonging to Req have only one binary value associated, and the elements belonging to SelSet may have either of the binary values.

26. A computer readable medium according to claim 25, wherein the alternative investigation system comprises an algorithm for successively undoing one of each of the choices of elements in SelSet and for checking the validity of the configuration instances corresponding to each respective choice vector against the configuration model, a found valid configuration instance corresponding to an alternative.

27. A computer readable medium according to claim 25, wherein the choice vector is input to the configuration engine to determine whether the corresponding selected set of choices is valid.

* * * * *